3,766,174
N-SUBSTITUTED PIPERIDINE COMPOUNDS
Michio Nakanishi, Oita, and Chiaki Tashiro and Kazuhiko Araki, Fukuoka, Japan, assignors to Yoshitomi Pharmaceutical Industries, Ltd., Osaka, Japan
No Drawing. Filed Jan. 7, 1971, Ser. No. 104,770
Int. Cl. C07d 29/26
U.S. Cl. 260—240 TC      7 Claims

ABSTRACT OF THE DISCLOSURE

N-substituted piperidine compounds of the formula:

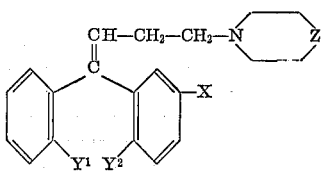

wherein X is a member selected from the group consisting of H, Cl, $CH_3$, $CF_3$, $OCH_3$ and $SCH_3$, each of $Y^1$ and $Y^2$ is H or $Y^1$ and $Y^2$ combined may represent a member selected from the group consisting of

—$CH_2$—$CH_2$—,

—CH=CH—, —$C(CH_3)_2$—, —O— and —S—, or the carbon atoms of the benzene rings to which $Y^1$ and $Y^2$ are attached, may be directly combined to form a fluorine ring, and Z is

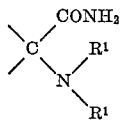

in which —$N(R^1)_2$ is a member selected from the group consisting of dimethylamino, piperidino and

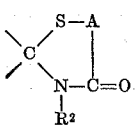

in which A is a member selected from the group consisting of —$CH_2$—, —$CH_2$—$CH_2$— and —$CH(CH_3)$— and $R^2$ is a member selected from the group consisting of H and a lower alkyl group of from 1 to 2 carbon atoms, and the method of preparing same. These compounds are useful as psychotropic agents.

BACKGROUND OF THE INVENTION

Field of the invention

The present invention relates to novel and therapeutically valuable N-substituted piperidine compounds and method for preparing the same.

SUMMARY OF THE INVENTION

Specifically, the present invention relates to N-substituted piperidine compounds of the formula:

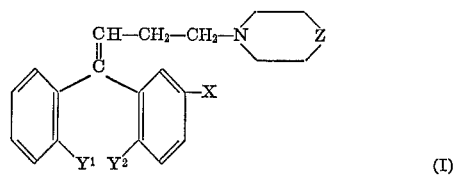

(I)

wherein X is a member selected from the group consisting of H, Cl, $CH_3$, $CF_3$, $OCH_3$ and $SCH_3$, each of $Y^1$ and $Y^2$ is H or $Y^1$ and $Y^2$ combined represent a member selected from the group consisting of —$CH_2$—$CH_2$—, —CH=CH—, —$C(CH_3)_2$—, —O— and —S—, or the carbon atoms of the benzene rings to which $Y^1$ and $Y^2$ are attached may be directly combined to form a fluorene ring, and Z is

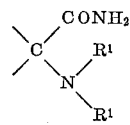

in which —$N(R^1)_2$ is a member selected from the group consisting of dimethylamino, piperidino and

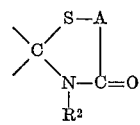

in which A is a member selected from the group consisting of —$CH_2$—, —$CH_2$—$CH_2$ and —$CH(CH_3)$— and $R^2$ is a member selected from the group consisting of H and a lower alkyl group of from 1 to 2 carbon atoms.

DETAILED DESCRIPTION OF THE INVENTION

The compounds of Formula I are produced by reacting a compound of the formula:

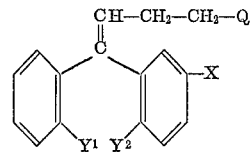

(II)

with a compound of the formula:

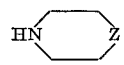

(III)

wherein Q is a reactive atom or radical such as halogen, p-tolylsulfonyloxy or methylsulfonyloxy, and X, $Y^1$, $Y^2$ and Z are as previously defined above.

This reaction is usually carried out by heating and preferably refluxing the reactants in a solvent for about five to ten hours. The solvent may be selected from the group consisting of water, alcohol (e.g. methanol, ethanol, isopropanol), aromtic hydrocarbons (e.g., benzene, toluene, xylene), ethers (e.g., tetrahydrofuran, dioxane, ethylene glycol dimethyl ether), ketones (e.g., acetone, methyl ethyl ktone), esters (e.g., ethyl acetate, butyl acetate), dimethylformamide, dimethyl sulfoxide and hexamethyl phosphoramide. The reaction is generally carried out at the boiling point of the solvent to be employed. The mole ratio employed between Compounds II and III is about 1:1.

This reaction may be carried out in the presence of a deacidifying agent, such as an alkali metal hydroxide or bicarbonate. The amount employed is dependent upon reaction conditions. An excess of the compounds of Formula III may also serve as the deacidifying agent.

The compounds of Formula I can be converted into acid addition salts with various inorganic acids (e.g. hydrochloric, hydrobromic, sulfuric, nitric acid) or various organic acids (e.g., oxalic, maleic, fumaric, citric, tartaric, methanesulfonic, toluenesulfonic acid).

The compounds of Formula I as well as their pharmaceutically acceptable acid addition salts suppress spontaneous motility, lower the body temperature and suppress fighting behaviour. Hence, they are useful as drugs for the treatment of schizophrenia, especially the chronic and mild depressive states with reduced spontaneity, as well as various psychoneuroses. For example, the compounds of Formula I listed below (A, B, C . . . Q) have the following pharmacological properties:

(A) 5-[3-(3-oxo-1-thia-4,8-diazaspiro[4.5]dec-8-yl) propylidene]-10,11-dihydro-5H-dibenzo[a,d]cycloheptene hydrochloride (B) 3-methyl-5-[3-(3-oxo-1-thia-4,8-diazaspiro[4.5]dec-8-yl)propylidene]-10,11-dihydro-5H-dibenzo[a,d]cycloheptene hydrochloride 1/2 hydrate (C) 9-[3-(3-oxo-1-thia-4,8-diazaspiro[4.5]dec-8-yl) propylidene]-10,10-dimethyl-9,10-dihydroanthracene hydrochloride (D) 3-chloro-5-[3-(4-ethyl-3-oxo-1-thia-4,8-diazaspiro-[4.5]dec-8-yl)propylidene]-10,11-dihydro-5H-dibenzo-[a,d]cycloheptene hydrochloride 2/3 hydrate (E) 9-[3-(3-oxo-1-thia-4,8-diazaspiro[4.5]dec-8-yl) propylidene]fluorene hydrochloride 1/2 hydrate (F) 1-phenyl-1-m-trifluoromethylphenyl-4-(4-oxo-1-thia-5,9-diazaspiro-[5.5]undec-9-yl)-1-butene hydrobromide (G) 5-[3-(3-oxo-1-thia-4,8-diazaspiro[4.5]dec-8-yl) propylidene]-5H-dibenzo[a,d]cycloheptene hydrochloride (H) 3-chloro-5-[3-(3-oxo-1-thia-4,8-diazaspiro[4.5]dec-8-yl)propylidene]-10,11-dihydro-5H-dibenzo[a,d] cycloheptene hydrochloride 1/2 hydrate (J) 3-chloro-5-[3-(4-carbamoyl-4-piperidinopiperidino) propylidene]-10,11-dihydro-5H-dibenzo[a,d]cycloheptene dihydrochloride 1/2 hydrate (K) 5-[3-(4-carbamoyl-4-piperidinopiperidino)propylidene]-10,11-dihydro-5H-dibenzo[a,d]cycloheptene dihydrochloride monohydrate (L) 5-[3-(4-carbamoyl-4-dimethylaminopiperidino) propylidene]-10,11-dihydro-5H-dibenzo[a,d]cycloheptene dihydrochloride 1/2 hydrate (M) 3-methyl-5-[3-(4-carbamoyl-4-piperidinopiperidino) propylidene]-10,11-dihydro-5H-dibenzo[a,d]cycloheptene dihydrochloride monohydrate (N) 1-phenyl-1-m-trifluoromethylphenyl-4-(4-carbamoyl-4-piperidinopiperidino)-1-butene dihydrochloride 1/3 hydrate (O) 5-[3-(4-carbamoyl-4-piperidinopiperidino)propylidene]-5H-dibenzo-[a,d]cycloheptene dihydrochloride monohydrate (P) 9-[3-(4-carbamoyl-4-piperidinopiperidino)propylidene]-10,10-dimethyl-9,10-dihydroanthracene dihydrochloride 3/2 hydrate (Q) 2-chloro-9-[3-(4-carbamoyl-4-piperidinopiperidino) propylidene]-thiaxanthene dihydrochloride monohydrate The tests were carried out by the following procedures:

(1) Suppression of spontaneous motility

Each group consisting of 5 male mice (dd-strain) weighing 20 to 25 g., was kept in a compartment. The spontaneous motility of the mice was counted by a magnetic counter of the photocell method according to P. B. Dews in "British Journal of Pharmacology," vol. 8, p. 46 (1953). Forty minutes after the intraperitoneal administration of the test compounds, the spontaneous motility was counted for 20 minutes. The $ED_{50}$ shows the dose required for 50% suppression of spontaneous motility.

The results are shown in Table 1.

TABLE 1

| Compound: | $ED_{50}$ (mg. kg. body weight) |
|---|---|
| A | 7 |
| B | 30 |
| C | 60 |
| D | 3 |
| E | 60 |
| F | 15 |
| G | 7 |
| H | 15 |
| J | 7.5 |
| K | 7 |
| L | 3.5 |
| M | 7 |
| N | 30 |
| O | 6 |
| P | 15 |
| Q | 0.46 |

(2) Body temperature lowering action

The test compounds were administered intraperitoneally to dd-strain male mice (20 to 25 g. body weight), each group consisting of five mice. One hour after the administration, the temperature in the stomach of each mouse was measured by using a thermistor (inner stomach thermometer). The dose $FD_{1.5}$ was determined as that which lowered the body temperature 1.5° C., as against the normal body temperature of control mice. The normal body temperature was 37.1±0.8° C. (mean of 215 mice in 43 groups±standard deviation).

The results are shown in Table 2.

TABLE 2

| Compound: | $FD_{1.5}$ (mg./kg. body weight) |
|---|---|
| A | 15 |
| C | 60 |
| D | 4 |
| F | 15 |
| G | 8 |
| H | 15 |
| J | 7 |
| K | 6 |
| L | 3.5 |
| M | 13 |
| N | 15 |
| O | 8 |
| P | 40 |
| Q | 0.46 |

(3) Suppression of fighting behaviour (a) Electrical stimulation method: Fighting episodes were produced in mice by the method of Tedeschi et al. (J. Pharm. Exptl. Therap., vol. 125, 28, 1959). Groups each of 8 to 12 dd-strain male mice (4 to 6 pairs), weighing 20 to 25 g., were kept in an apparatus consisting of a grid floor, and were delivered an electrical stimulation of direct current on the order of 1.3 milliamperes, 530 volts at a rate of 10 cycles per second for 3 minutes.

Pairs of mice treated with the test compounds exhibiting 3 fighting episodes or less within 3 minutes of footshock were designated as negative responders.

One hour after the oral administration of the test compounds, the suppression rate at each dose was determined as is shown in Table 3.

TABLE 3

| Compound: | Dose (mg./kg. body weight) | Suppression rate (percent) |
|---|---|---|
| A | 80 | 67 |
| B | 160 | 67 |
| D | 20 | 33 |
|  | 40 | 67 |
| H | 80 | 25 |
|  | 160 | 50 |
| J | 20 | 33 |
|  | 40 | 67 |
| K | 160 | 33 |
| L | 160 | 100 |
| M | 80 | 33 |
|  | 160 | 67 |
| O | 80 | 67 |
| Q | 10 | 25 |
|  | 20 | 50 |

(b) Effect on the hyperemotional behaviour of olfactory bulb removal rats: Wister strain female rats, weighing about 150 g., were anesthetized by intraperitoneal administration of thiamylal sodium (60 mg./kg. body weight) and subsequently the olfactory bulb was removed. Each animal was then separately fed in a cage (245 x 380 x 185 mm.).

The degree of hyperemotionality of the rats was observed and scored on the tests of (a)–(e) using the following score system.

Tests:
(a) When a rod thrusted before the nose,
(b) When the back of the rat was tapped with a rod,
(c) When the head was softly touched with a rod,
(d) When the back of the rat was breathed upon,
(e) When the middle of the tail was picked up with a pincette, Scoring: Score
Disappearance of righting reflex --------------- 0
Sedation in prone state --------------------- 0.5
Sedation with slight movement --------------- 1.0
Slightly sensitive response ------------------ 2.0
Sensitive response (defensive and aggression) -- 3.0
Over-sensitive response (extremely defensive and aggressive) ------------------------------ 4.0

The mean total score per rat was 6.5 in 157 intact animals under the same feeding and 18 in those rats whose olfactory bulb was removed, respectively.

The suppression rate by the test compounds was calculated from the following formula:

$$\text{Suppression rate (percent)} = \frac{a-b}{a} \times 100$$

(a) Mean of the total score for 5 animals before the administration of the test compound
(b) Minimum total score observed after the administration of the test compound The test results are shown in Table 4.

TABLE 4

| Compound: | Dose (mg./kg. body weight) | Suppression rate (percent) |
|---|---|---|
| A | 160 | 27 |
| J | 20 | 33 |
|  | 40 | 67 |
| K | 160 | 33 |
| L | 160 | 100 |
| M | 80 | 33 |
|  | 160 | 67 |
| O | 80 | 67 |
| Q | 10 | 25 |
|  | 20 | 50 |

(4) Acute toxicity in mice

The test compounds were administered intraperitoneally to dd-strain mice, weighing 20 to 25 g., and the lethality at each dose is shown in Table 5.

TABLE 5

| Compound: | Dose (mg./kg. body weight) | Lethality (percent) |
|---|---|---|
| A | 80 | 0 |
|  | 160 | 80 |
| D | 320 | 60 |
| F | 160 | 0 |
|  | 320 | 60 |
|  | 320 | 0 |
| E | 320 | 0 |
| H | 80 | 20 |
|  | 160 | 40 |
| J | 320 | 100 |
|  | 80 | 40 |
|  | 160 | 100 |
| K | 80 | 0 |
|  | 160 | 100 |
| L | 40 | 0 |
| M | 80 | 80 |
|  | 80 | 0 |
| N | 160 | 100 |
|  | 40 | 0 |
| O | 80 | 100 |
|  | 80 | 40 |
| P | 160 | 100 |
|  | 80 | 0 |
| Q | 160 | 20 |
|  | 320 | 100 |

The Compounds I and pharmaceutical acceptable acid addition salts thereof can be administered safely per se or in the form of a pharmaceutical composition in admixture with a suitable carrier or adjuvant, which can be administered orally, without causing harm to the patient.

The pharmaceutical composition can take the form of tablets, granules, powders, etc. The following are examples of the compositions of the invention which may be administered for pharmaceutical purposes.

(1) 50 mg. tablets (7 mm. in diameter, 7.5R) and 25 mg. tablets (6.5 mm. in diameter, 7R) are prepared from the following compositions (a) and (b):

(a)

|  | Mg. |
|---|---|
| Compound A | 50.0 |
| Lactose | 42.0 |
| Starch | 20.0 |
| Microcrystalline cellulose | 10.0 |
| Magnesium stearate | 1.5 |
| Methyl cellulose | 1.5 |
| Total | 125.0 |

(b)

|  | Mg. |
|---|---|
| Compound J | 25.0 |
| Lactose | 42.0 |
| Starch | 15.0 |
| Microcrystalline cellulose | 10.0 |
| Magnesium stearate | 1.5 |
| Methyl cellulose | 1.5 |
| Total | 95.0 |

(2) 10% granular compositions (a) and (b) are prepared from the following ingredients:

(a)

|  | G. |
|---|---|
| Compound A | 100 |
| Lactose | 700 |
| Corn starch | 190 |
| 5% paste of methyl cellulose | 200 |

(b)

|  | G. |
|---|---|
| Compound J | 100 |
| Lactose | 750 |
| Corn starch | 137.5 |
| 5% paste of methyl cellulose | 250 |

Each of the above mixtures was kneaded and granulated. The granules obtained are dried at 50° C., sifted through (32 mesh).

The usual daily dose of the compound in accordance with Formula I or a pharmaceutical acceptable acid addition salts thereof may preferably be in the range of about 150 to about 300 milligrams per human adult.

A better understanding of the present invention will be obtained from the following examples, which are merely illustrative and not limitative of the present invention:

EXAMPLE 1

A mixture of 4.7 g. of 5-(3-bromopropylidene)-10,11-dihydro-5H-dibenzo[a,d]cycloheptene, 4.7 g. of 3-oxo-1-thia-4,8-diazaspiro[4.5]decane hydrobromide, 40 ml. of ethanol, 4 ml. of water and 4 g. of potassium carbonate is refluxed for 16 hours. The alcohol is distilled off. The residue is washed with water, heated with 60 ml. of isopropyl ether and cooled. The crystals are collected by filtration and dissolved in methanol. The solution is treated with concentrated hydrochloric acid. The hydrochloride thus obtained is recrystallized from aqueous methanol to give 5.0 g. of 5-[3-(3-oxo-1-thia-4,8-diazaspiro[4.5]dec-8-yl)propylidene] - 10,11 - dihydro - 5H-dibenzo[a,d]cycloheptene hydrochloride which appear as white crystals, melting at 276–278° C.

EXAMPLE 2

A mixture of 1.7 g. of 1-phenyl-1-m-trifluoromethylphenyl-4-bromo-1-butene, 3 g. of 2-methyl-3-oxo-1-thia-4,8-diazaspiro[4.5]decane hydrobromide, 50 ml. of toluene, 8 ml. of dimethylformamide, 5 g. of potassium carbonate and 3 ml. of water is refluxed for 16 hours. The solvent is distilled off. The residue is washed with water and extracted with isopropyl ether. The ether layer is shaken with 20 ml. of 10% hydrochloric acid to separate out an oily substance insoluble in both of ether or hydrochloric acid. The oil obtained is crystallized from a mixture of ethyl acetate and methanol to give 1-phenyl-1-m-trifluoromethylphenyl-4-(2 - methyl - 3 - oxo-1-thia-4,8-diazaspiro-[4.5]dec-8-yl)-1-butene hydrochloride, which appear as white crystals, melting at 196° C.

EXAMPLE 3

A mixture of 4.7 g. of 5-(3-bromopropylidene)-10,11-dihydro-5H-dibenzo[a,d]cycloheptene and 4.2 g. of 4-carbamoyl-4-piperidinopiperidine in 30 ml. of ethanol is refluxed in the presence of 5.0 g. of potassium carbonate for 18 hours. The alcohol is distilled off. The oily residue is washed with water, dissolved in isopropanol and treated with concentrated hydrochloric acid. The crystals thus obtained are recrystallized from aqueous methanol to give 4.5 g. of 5-[3-(4-carbamoyl-4-piperidinopiperidino)propylidene] - 10,11 - dihydro-5H-dibenzo[a,d]cycloheptene dihydrochloride monohydrate, which appear as white crystals, melting at 275° C. (foaming).

EXAMPLE 4

Using 3.5 g. of 4-carbamoyl-4-dimethylaminopiperidine instead of 4-carbamoyl-4-piperidinopiperidine in Example 3, the procedure of Example 3 is repeated. The crystals obtained are recrystallized from isopropanol to give 4.0 g. of 5-[3-4-carbamoyl-4-dimethylamino piperidine]propylidene-10,11-dihydro - 5H - dibenzo[a,d]cycloheptene dihydrochloride containing ½ molecule of water and ½ molecule of isopropanol of crystallization, which appear as white crystals, melting at 255° C. (foaming).

EXAMPLE 5

3-chloro-5-(3-bromopropylidene) - 10,11 - dihydro-5H-dibenzo[a,d]cycloheptene (2.0 g.) and 2.0 g. of 4- carbamoyl-4-piperidinopiperidine are allowed to react by the procedure of Example 3, giving 2.1 g. of 3-chloro-5-[3-(4-carbamoyl - 4 - piperidinopiperidino)propylidene]-10,11-dihydro-5H-dibenzo[a,d]cycloheptene dihydrochloride ½ hydrate, which appear as white crystals, melting at 278° C.

EXAMPLE 6

9-(3-bromopylidene)fluorene (2.0 g.) and 2.0 g. of 4-carbamoyl-4-piperidinopiperidine are allowed to react by the procedure of Example 3, giving 1.8 g. of 9-[3-(4-carbamoyl-4-piperidinopiperidino)propylidene] - fluorene dihydrochloride monohydrate, which appear as white crystals, melting at 253° C.

EXAMPLE 7

3-methyl-5-(3-bromopropylidene - 10,11 - dihydro-5H-dibenzo[a,d]cycloheptene (6 g.) and 8 g. of 4-carbamoyl-4-piperidinopiperidine are allowed to react by the procedure of Example 3, giving 8.5 g. of 3-methyl-5-[3-(4-carbamoyl - 4 - piperidinopiperidino)propylidene]-10,11-dihydro - 5H - dibenzo[a,d]cycloheptene dihydrochloride monohydrate, melting at 284° C.

EXAMPLE 8

A mixture of 2 g. of 1-phenyl-1-m-trifluoromethylphenyl-4-bromo-1-butene and 3 g. of 4-carbamoyl-4-piperidinopiperidine in 10 ml. of toluene plus 3 ml. of dimethylformamide is treated by the procedure of Example 3 to give 2.3 g. of 1-phenyl-1-m-trifluoromethylphenyl-4-(4-carbamoyl-4-piperidinopiperidino)-1-butene dihydrochloride ⅓ hydrate, melting at 255–256° C.

EXAMPLE 9

5-(3-bromopropylidene) - 5H - dibenzo[a,d]cycloheptene (3 g.) and 4 g. of 4-carbamoyl-4-piperidinopiperidine are allowed to react by the procedure of Example 3, giving 5-[3-(4-carbamoyl-4-piperidinopiperidino)propylidene] - 5H - dibenzo[a,d]cycloheptene dihydrochloride, melting at 253° C.

EXAMPLES 10–20

Following the procedure of either Example 1 or 2, but substituting an equivalent amount of the appropriate starting materials, the following N-substituted piperidine spiro Compounds 10–16 are also produced:

(10) 3-chloro-5-[3-(4-ethyl-3-oxo-1-thia-4,8-diazaspiro-[4.5]dec-8-yl)propylidene]-10,11-dihydro-5H-dibenzo[a,d]cycloheptene hydrochloride melting at 234° C.,
(11) 1-phenyl-1-m-trifluoromethylphenyl-4-(4-oxo-1-thia-5,9-diazaspiro[5.5]undec-9-yl)-1-butene hydrobromide melting at 208° C.,
(12) 5-[3-(3-oxo-1-thia-4,8-diazaspiro[4.5]dec-8-yl)propylidene]5H-dibenzo[a,d]cycloheptene hydrochloride melting at 278° C.,
(13) 9-[3-(3-oxo-1-thia-4,8-diazaspiro[4.5]dec-8-yl)propylidene]fluorene hydrochloride ½ hydrate melting at 252° C.,
(14) 3-methyl-5-[3-(3-oxo-1-thia-4,8-diazaspiro-[4,5]dec-8-yl)propylidene]10,11-dihydro-5H-dibenzo[a,d]cycloheptene hydrochloride melting at 273° C.,
(15) 9-[3-(3-oxo-1-thia-4,8-diazaspiro[4.5]dec-8-yl)propylidene]-10,10-dimethyl-9,10-dihydroanthracene hydrochloride melting at 280° C., and
(16) 3-chloro-5-[3-(3-oxo-1-thia-4,8-diazaspiro[4.5]dec-8-yl)propylidene]-10,11-dihydro-5H-dibenzo-[a,d]cycloheptene hydrochloride ½ hydrate melting at 271° C.

Following the procedure of Example 3, the following N-substituted piperidine Compounds 17–20 are also produced:

(17) 9-[3-(4-carbamoyl-4-piperidinopiperidino)propylidene]-10,10-dimethyl-9,10-dihydroanthracene hydrochloride melting at 267° C.,
(18) 2-chloro-9-[3-(4-carbamoyl-4-piperidinopiperidino)propylidene]-thiaxanthene dihydrochloride monohydrate melting at 273.5° C. (decomposition),

(19) 2-methoxy-9-[3-(4-carbamoyl-4-piperidino-piperidino)propylidene]-xanthene dihydrochloride monohydrate melting at 263° C. (decomposition), and

(20) 2-methylthio-9-[3-(4-carbamoyl-4-piperidino-piperidino)propylidene]thiaxanthene dihydrochloride 1/2 hydrate melting at 268° C. (decomposition).

Although the present invention has been adequately described in the foregoing specification and examples included therein, it is readily apparent that various changes and modifications may be made without departing from the scope thereof.

What is claimed is:

1. An N-substituted piperidine compound of the formula:

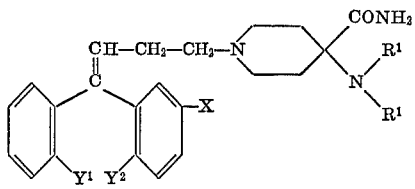

wherein X represents a member selected from the group consisting of a hydrogen atom, a chlorine atom, and a methyl group; wherein each of $Y^1$ and $Y^2$ is combined to represent a member selected from the group consisting of —$CH_2$—$CH_2$—, —CH=CH—, and —S—; and wherein $N(R^1)_2$ is a member selected from the group consisting of a dimethylamino group and a piperidino group.

2. The compound according to claim 1: 3-chloro-5-[3-(4-carbamoyl - 4 - piperidinopiperidino)propylidene]-10,11-dihydro-5H-dibenzo[a,d]cycloheptene.

3. The compound according to claim 1: 5-[3-(4-carbamoyl-4-piperidinopiperidino)propylidene]10,11 - dihydro-5H-dibenzo-[a,d]cycloheptene.

4. The compound according to claim 1: 5-[3-(4-carbamoyl-4-dimethylaminopiperidino)propylidene] - 10,11-dihydro-5H-dibenzo[a,d]cycloheptene.

5. The compound according to claim 1: 3-methyl-5-[3-(4-carbamoyl - 4 - piperidinopiperidino)propylidene]-10,11-dihydro-5H-dibenzo[a,d]cycloheptene.

6. The compound according to claim 1: 5-[3-(4-carbamoyl - 4 - piperidinopiperidino)propylidene] - 5H - dibenzo[a,d]cycloheptene.

7. The compound according to claim 1: 2-chloro-9-[3-(4 - carbamoyl - 4 - piperidinopiperidino)propylidene]thiaxanthene.

References Cited
UNITED STATES PATENTS

| | | | |
|---|---|---|---|
| 3,073,847 | 1/1963 | Doebel et al. | 260—240 TC X |
| 3,074,953 | 1/1963 | Davis et al. | 260—240 TC X |
| 3,190,893 | 6/1965 | Holm | 260—240 TC X |
| 3,272,864 | 9/1966 | Hoffsommer et al. | 260—240 TC X |
| 3,668,210 | 6/1972 | Nakanishi et al. | 260—293.86 |

JOHN D. RANDOLPH, Primary Examiner

U.S. Cl. X.R.

424—267; 260—240 R, 240.1, 243 R, 293.63, 293.66, 293.86